April 20, 1926.
A. S. BERTELS
1,581,160
BATTERY CONTROL SYSTEM
Filed April 2, 1924
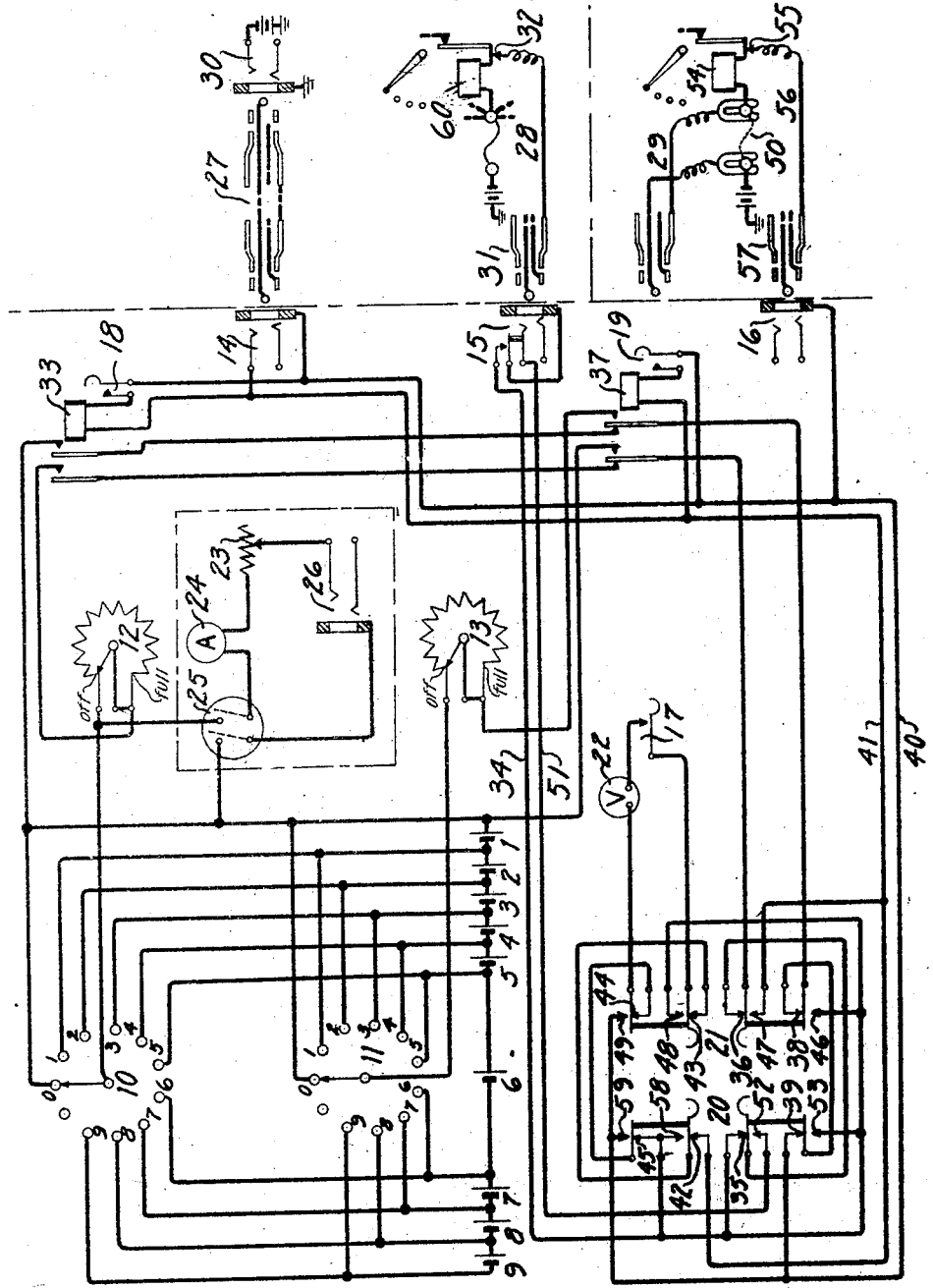
Inventor:
Arnold S. Bertels.
by E.W.Adam Atty.

Patented Apr. 20, 1926.

1,581,160

UNITED STATES PATENT OFFICE.

ARNOLD S. BERTELS, OF TENAFLY, NEW JERSEY, ASSIGNOR TO WESTERN ELECTRIC COMPANY, INCORPORATED, OF NEW YORK, N. Y., A CORPORATION OF NEW YORK.

BATTERY-CONTROL SYSTEM.

Application filed April 2, 1924. Serial No. 703,716.

*To all whom it may concern:*

Be it known that I, ARNOLD S. BERTELS, a citizen of the United States of America, residing at Tenafly, in the county of Bergen, State of New Jersey, have invented certain new and useful Improvements in Battery-Control Systems, of which the following is a full, clear, concise, and exact description.

This invention relates to testing devices, and more particularly, to a device for use in the testing and adjusting of magnets.

The object of the invention is the provision of means for controlling the current flowing through magnets when testing their adjustment.

A feature of the invention lies in controlling the current flowing through the magnet by accurately controlling the potential applied across the terminals thereof.

Another feature of the invention lies in the provision of an auxiliary source of potential to oppose or augment the operating source for such magnets.

A further feature of the invention lies in means for accurately adjusting said auxiliary potential to produce predetermined voltages at the terminals of the magnets to be tested.

These and other features of the invention will be more clearly understood from a consideration of the following description in connection with the attached drawing and appended claims.

The drawing illustrates a circuit arrangement embodying the features of the invention. The apparatus and circuits appearing at the left of the dotted line are intended to be assembled in a unitary structure such as a test box. The cords appearing at the right of the dotted line are used for connecting the apparatus in the test box with a battery and ground, and with the magnets to be tested.

The apparatus in the test box consists of a group of storage cells 1 to 9. There may be more or less of these sells according to the type of magnet to be tested and the allowable variation in voltage. The sells are connected in series and a lead is connected from the negative terminal of each cell to correspondingly numbered contacts or terminals on switches 10 and 11. The positive terminal of cell 1 is connected to the zero terminal of switches 10 and 11. Two rheostats 12 and 13 are provided for further regulating the current. Jacks 14, 15 and 16 appear in the box, jack 14 serving for connecting battery and ground to the apparatus in the test box, jacks 15 and 16 for connecting with the magnet to be tested. The following keys are also provided: key 17 which controls the voltmeter circuit, key 18 which is used when the magnet is to be tested with a minimum voltage, key 19 when the magnet is to be tested with a maximum voltage, key 20 which is used when the magnet is connected to ground and key 21 which is used in an alternative method of testing. Voltmeter 22 is provided for reading the voltage applied to the terminals of the magnet. In addition to the foregoing apparatus an adjustable rheostat 23 and ammeter 24, double-pole switch 25 and a jack 26 are provided for charging the storage battery when necessary. Cord 27 is used for connecting battery and ground from the central office sources to the test box. Cords 28 and 56 are provided with a clip terminal which may be connected to the desired point in the magnet circuit. Cord 29 in the lower right dotted rectangle is used only in connection with an alternative method of testing the magnet.

When the test box is to be used in testing a group of magnets, switches 10 and 11 are set in their zero position and rheostats 12 and 13 at their off position. All keys are released. A patching cord such as cord 27 is used for connecting jack 14 to battery and ground supply jack 30 conveniently located with respect to the magnets to be tested. Plug 31 of cord 28 is inserted in jack 15 and clip 32 fastened to that terminal of the magnet winding which is not connected to the battery. Assuming that the magnet is first to be tested at the minimum voltage at which it is expected to operate, key 18 is operated, closing a circuit for relay 33 extending from battery, tip of jack 30, tip conductor of cord 27, tip of jack 14, winding of relay 33, contact of key 18, sleeve of jack 14, sleeve conductor of cord 27, sleeve of jack 30 to ground. Relay 33 operates and connects the auxiliary battery in series with the magnet. Key 17 is now closed rendering the voltmeter operative. The circuit for magnet 60, which is undergoing test, may be traced from battery through the winding of that magnet, clip 32, conductor of cord 28, sleeve of plug 31, sleeve and contact of jack 15, conductor 34, contact 35 of key 20, contact 36 of key 21, outer back contact of relay 37, outer front contact of relay 33, through rheostat 12, brush of switch 10 and zero terminal thereof, inner front contact of relay 33, inner back contact of relay 37, contact 38 of key 21, contact 39 of key 20, conductor 40, sleeve of jack 14 and thence to ground. The voltmeter circuit may be traced from battery on the tip of jack 30, tip conductor of cord 27, tip of jack 14, conductor 41, contact 42 of key 20, contact 43 of key 21, voltmeter key 17, voltmeter 22, contact 44 of key 21, contact 45 of key 20, contact 35 of key 20, contact 36 of key 21 and thence through rheostat 12 and switch 10, back over the circuit previously traced for magnet 60 to grounded conductor 40. It will be seen that the voltmeter circuit above traced is the equivalent of connecting the voltmeter across the terminals of the magnet, since the battery supplied at jack 30 is the same battery which is supplied to the magnet 60 and the other terminal of the voltmeter is connected to the magnet circuit at a point between the magnet winding and the auxiliary potential used for adjusting the voltage. Switch 10 is now adjusted step by step. When the brush of switch 10 makes contact with the No. 1 terminal, the circuit of magnet 60 is extended from rheostat 12 over the brush and No. 1 contact of switch 10, through the No. 1 cell of the auxiliary battery to the inner front contact of relay 33. It is to be noted that cell 1 is so connected as to oppose the battery connected directly to the winding of magnet 60, thus reducing the effective potential across the terminals of the magnet. With the brush of switch 10 at its No. 2 terminal, two cells of the storage battery are included in the circuit, etc. Switch 10 is adjusted in this manner until the voltage registered on voltmeter 22 differs from and is greater than the desired minimum by less than the voltage introduced by the addition of one cell of the auxiliary battery. Rheostat 12 is then adjusted to introduce sufficient resistance to further reduce the voltage to the desired minimum. When the voltage applied to the terminals of magnet 60 is thus adjusted, voltmeter key 17 is opened and the adjustment of the magnet can be tested and varied, if necessary, to cause the magnet to operate in the desired manner. After such adjustment, clip 32 may be attached to the break contact of the armature of the magnet and the ability of the magnet to operate the switch under this voltage condition tested.

The magnet is now tested at its maximum permissible voltage, clip 32 is returned to the winding terminal of the magnet. Key 18 is released and key 19 is closed. The operation of key 19 closes a circuit for relay 37 from battery on conductor 41, through the winding of relay 37, contact of key 19 to grounded conductor 40. Relay 37 operates and connects the auxiliary battery through switch 11 and rheostat 13 to the magnet circuit. Voltmeter key 17 is closed. The circuit for magnet 60 in this case extends from battery through the magnet winding, clip 32, cord 28, sleeve of plug 31, sleeve and contact of jack 15, conductor 34, contact 35 of key 20, contact 36 of key 21, outer front contact of relay 37, zero terminal and brush of switch 11, rheostat 13, inner front contact of relay 37, contact 38 of key 21, contact 39 of key 20 to grounded conductor 40. Switch 11 is now adjusted to its No. 1 terminal introducing one cell of the auxiliary battery. It is to be noted in this case that the circuit is no arranged as to place the auxiliary battery in series aiding with the central office battery so as to increase the voltage applied. Switch 11 is further adjusted until the voltage as registered on voltmeter 22 exceeds the desired maximum by less than the voltage introduced by the addition of one cell of the auxiliary battery. Rheostat 13 is now adjusted to bring this voltage back to the maximum desired. Voltmeter key 17 is released and tests made on magnet 60 as desired. Key 19 may be released and key 18 again operated to verify the correctness of the adjustment for the minimum voltage. The maximum and minimum voltages may thus alternately be applied to magnet 60 until the adjustment is satisfactory at both voltages. To test the next magnet, both keys 18 and 19 are released and the clip 32 moved to the terminal of the next magnet. It will probably be necessary to change the adjustment of the rheostats but slightly in passing from one magnet to another in a group of the same type.

In some cases, the magnet winding is connected directly to ground instead of to battery. Where this is the case key 21 is operated and the circuit of the magnet altered so as to extend from conductor 34, contact 46 of key 21, inner front contact of relay 33 or 37, through the corresponding switch and rheostat, back to the outer front contact of that relay, contact 47 of key 21 to battery on conductor 41; and the voltmeter circuit extends from conductor 34, contact 48 of key 21, voltmeter key 17, voltmeter 22, contact 49 of key 21 to grounded conductor 40. It is therefore not necessary to provide different test boxes for use with magnets which are connected to ground.

It is also possible to use an alternative method of testing magnets where such magnets are provided with individual fuses between the battery supply and the magnet winding. The manner of connecting the test box to the magnet for this method of testing is illustrated in the dotted rectangle at the lower right corner of the drawing. An additional cord 29, is used provided with two conductors terminated in U-shaped clips. The individual fuse indicated by the dotted line 50 is removed and the U-shaped clips inserted under the terminals thereof in the manner indicated in the drawing. The cord 56 and clip 55 are exactly the same as cord 28 and clip 32 and the same cord may be used for both methods, the plug being inserted in jack 16 for this latter method. Cord 29 is inserted in jack 15 and patching cord 27 in jack 14 as before. With this arrangement it is necessary to close key 20 and the circuit of the magnet may be traced as follows: Battery, tip conductor of cord 29, tip of jack 15, conductor 51, contact 52 of key 20, contact 36 of key 21, through the outer front contact of relay 33 or 37, through the corresponding switch and rheostat, back to the inner contact of the same relay, contact 38 of key 21, contact 53 of key 20, conductor 34 sleeve of jack 15, sleeve conductor of cord 29, winding of magnet 54, clip 55, cord 56, sleeve of plug 57, sleeve of jack 16 to grounded conductor 40. The voltmeter circuit in this case extends from conductor 34, contact 58 of key 20, contact 43 of key 21, voltmeter key 17, voltmeter 22, contact 44 of key 21, contact 59 of key 20 to grounded conductor 40. In this case it will be noted the voltmeter is connected to the magnet circuit at a point beween the complete battery supply and the magnet winding. The manner of adjusting the voltage to the desired value is the same as previously described.

Means for charging the storage battery is provided within the test box and includes rheostat 23, ammeter 24, double-pole switch 25 and jack 26 which may be connected by means of a patching cord similar to cord 27 to a battery supply jack similar to jack 30.

Although the magnets 60 and 54 are shown in connection with a step by step rotary switch, the invention is applicable for testing the operating magnets of any type of switch, as well as any piece of electrically operated apparatus where it is necessary to maintain the current and voltage within well defined limits.

What is claimed is:

1. In a testing device for testing electromagnets, an operating circuit for the magnet including a battery connected to one terminal thereof, an auxiliary battery, means for connecting said auxiliary battery to oppose said first battery, means for connecting said auxiliary battery to aid said first battery, and means for independently adjusting the potential resulting from each such connection.

2. In a testing device for testing electromagnets, an operating circuit for the magnet including a battery connected to one terminal thereof, an auxiliary battery, a circuit for connecting said auxiliary battery to the circuit of said magnet to oppose said first battery, a circuit for connecting said auxiliary battery to the circuit of said magnet to aid said first battery, means in each of said circuits for independently adjusting the resulting potential, and means to render either of said circuits effective at will.

3. In a testing device for testing electromagnets, an operating circuit for the magnet including a battery connected to one terminal thereof, an auxiliary battery comprising a plurality of cells, a circuit for connecting said auxiliary battery to the circuit of said magnet to oppose said first battery, a circuit for connecting said auxiliary battery to the circuit of said magnet to aid said first battery, a switch in each of said circuits for independently varying the number of cells of said auxiliary battery connected to the circuit of said first battery, and means to render either of said auxiliary circuits effective at will.

4. In a testing device for testing a magnet, an operating circuit for the magnet including a battery connected to one terminal thereof, an auxiliary battery comprising a plurality of cells, a pair of switches the stationary contacts of which are connected respectively to points intermediate said cells, one of said switches serving to connect one or more of said cells in the circuit of said magnet in a direction to oppose the battery included in the operating circuit of said magnet, and the other of said switches serving to connect one or more of said cells in the circuit of said magnet in a direction to aid said first battery, and rheostats connected serially with said switches for further adjusting the potential at the terminals of said magnet.

In witness whereof, I hereunto subscribe my name this 27th day of March A. D., 1924.

ARNOLD S. BERTELS.